US009078454B2

(12) United States Patent
Jürs

(10) Patent No.: US 9,078,454 B2
(45) Date of Patent: Jul. 14, 2015

(54) APPARATUS AND METHOD FOR SEVERING FILLETS COMPLETELY FROM THE CARCASS OF BEHEADED AND EVISCERATED FISH, A CROSSPIECE LEFT BY OTHER TOOLS BEING CUT THROUGH IN THE PROCESS

(75) Inventor: Michael Jürs, Haffkrug (DE)

(73) Assignee: Nordischer Maschinenbau Rud. Baader GmbH + Co. KG, Lubeck (DE)

( * ) Notice: Subject to any disclaimer, the term of this patent is extended or adjusted under 35 U.S.C. 154(b) by 265 days.

(21) Appl. No.: 13/638,880

(22) PCT Filed: May 24, 2011

(86) PCT No.: PCT/EP2011/058432
§ 371 (c)(1),
(2), (4) Date: Oct. 1, 2012

(87) PCT Pub. No.: WO2011/151221
PCT Pub. Date: Dec. 8, 2011

(65) Prior Publication Data
US 2013/0035023 A1    Feb. 7, 2013

(30) Foreign Application Priority Data

May 31, 2010  (DE) .......................... 10 2010 022 056

(51) Int. Cl.
*A22C 25/16*    (2006.01)
(52) U.S. Cl.
CPC ...................................... *A22C 25/16* (2013.01)
(58) Field of Classification Search
USPC ................................................ 452/160–163
See application file for complete search history.

(56) References Cited

U.S. PATENT DOCUMENTS 3,570,048 A     3/1971  Michael
4,151,629 A  *  5/1979  Braeger ........................ 452/121

(Continued)

FOREIGN PATENT DOCUMENTS

DE       1239827 B    5/1967
DE       3708365 A1   9/1988

(Continued)

OTHER PUBLICATIONS

Examination Report dated Aug. 1, 2013 from Chilean Patent Application CL 02981-2012 by the Chilean Patent Office (7 pages).

(Continued)

*Primary Examiner* — Richard Price, Jr.
(74) *Attorney, Agent, or Firm* — Sunstone IP

(57) ABSTRACT

The invention relates to an apparatus for completely separating fillets from the skeleton of decapitated and gutted fish, cutting through a web left by separating tools mounted in front of the apparatus in the direction of transport T, comprising a separating unit with a pair of circular blades for separating the web, and an endlessly rotating transport conveyor with at least one saddle-shaped supporting body for receiving the fish and conveying them in the direction of transport T through the separating unit tail first, wherein the circular blades are mounted on a carrier which is movable up and down transversely to the plane of transport E, which is distinguished in that the two circular blades of the separating unit are driven in the same direction opposite the direction of transport T. Furthermore the invention relates to a corresponding method.

11 Claims, 3 Drawing Sheets

(56) References Cited

U.S. PATENT DOCUMENTS

Figure 1:
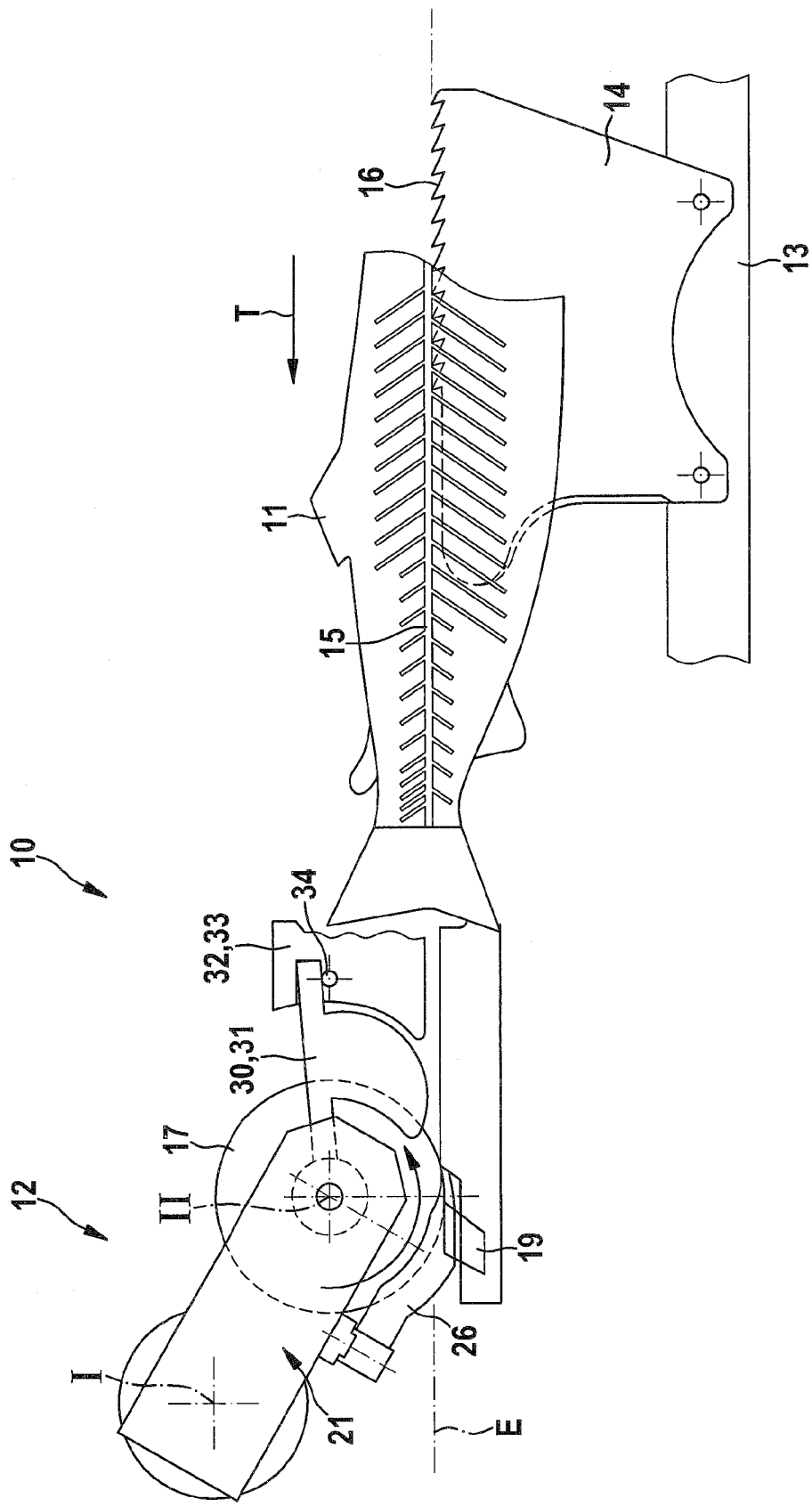

| | | | |
|---|---|---|---|
| 4,236,275 A * | 12/1980 | Westerdahl | 452/135 |
| 4,748,721 A * | 6/1988 | Braeger | 452/127 |
| 4,748,723 A | 6/1988 | Braeger et al. | |
| 5,871,395 A * | 2/1999 | Grabau et al. | 452/162 |
| 6,200,211 B1 * | 3/2001 | Braeger et al. | 452/162 |
| 6,280,313 B1 * | 8/2001 | Braeger et al. | 452/161 |
| 6,322,437 B1 * | 11/2001 | Grabau et al. | 452/161 |
| 7,090,574 B2 * | 8/2006 | Braeger et al. | 452/162 |
| 7,927,194 B2 | 4/2011 | Jürs et al. | |
| 8,272,928 B2 * | 9/2012 | Finke et al. | 452/161 |
| 8,298,050 B2 * | 10/2012 | Jurs et al. | 452/162 |
| 8,387,522 B2 | 3/2013 | Rusko et al. | |
| 8,814,637 B2 * | 8/2014 | Jurs et al. | 452/162 |
| 2013/0059514 A1 | 3/2013 | Jurs et al. | |

FOREIGN PATENT DOCUMENTS

| | | |
|---|---|---|
| DE | 102007053904 B3 | 1/2009 |
| DE | 102007053905 B3 | 1/2009 |
| JP | 06-038671 | 2/1994 |
| JP | 08-070760 | 3/1996 |
| JP | 2000-069902 | 3/2000 |
| WO | 2009059758 A1 | 5/2009 |

OTHER PUBLICATIONS

International Search Report dated Sep. 21, 2011 from International Patent Application No. PCT/EP2011/058432 filed May 24, 2011 (6 pages).

Office Action dated Mar. 7, 2011 from German Patent Application No. 102010022056.6 filed May 31, 2010 (3 pages).

Office Action dated Nov. 5, 2013 from Japanese Patent Application No. 2013-505501 filed Oct. 21, 2013.

Office Action dated Nov. 27, 2013 from Korean Patent Application No. 10-2012-7028480 filed Oct. 30, 2012.

* cited by examiner

APPARATUS AND METHOD FOR SEVERING FILLETS COMPLETELY FROM THE CARCASS OF BEHEADED AND EVISCERATED FISH, A CROSSPIECE LEFT BY OTHER TOOLS BEING CUT THROUGH IN THE PROCESS

The invention relates to an apparatus for completely separating fillets from the skeleton of decapitated and gutted fish by cutting through a web left by separating tools mounted in front of the apparatus in the direction of transport T, comprising a separating unit with a pair of circular blades for separating the web, and an endlessly rotating transport conveyor with at least one saddle-shaped supporting body for receiving the fish and conveying them in the direction of transport T through the separating unit tail first, wherein the circular blades are mounted on a carrier which is movable up and down transversely to the plane of transport E.

The invention further relates to a method for completely separating fillets from the skeleton of decapitated and gutted fish by cutting through a web left during previous separating cuts, in particular ventral and dorsal cuts, comprising the steps of: transporting a fish resting with its backbone on a supporting body with its back at the top, tail first through an apparatus for separating the fillets from the skeleton, wherein the fillets are separated from the skeleton during transport by means of rotating circular blades.

Such apparatuses and methods are used in the fish-processing industry to fillet fish automatically. In the process, the fish are usually transported by means of transport conveyors or supporting bodies arranged on the transport conveyor and also referred to as transport saddles, to the individual processing stations, amongst others also to the apparatus for completely separating fillets from the skeleton of decapitated and gutted fish. An essential working step is the complete separation or detachment of the fillets from the skeleton, which are usually already to a very large extent detached from the skeleton by tools mounted in front of the separating apparatus in the direction of transport T, such as e.g. ventral blades, dorsal blades, rib scrapers or the like. The last working step during filleting in a saddle filleting machine includes the task of separating the two fillets which are inter alia to a very large extent detached from the skeleton by the ventral cuts and dorsal cuts and which are still connected by a web to the skeleton round the backbone/vertebral column, beginning at the tail region, that is, from the root of the tail to the beginning of the ventral cavity, so that the fillets are completely free. The separating unit for performing the separating cuts is usually arranged on both sides of the fish to be processed, so that the fillets can be separated from the backbone or from the skeleton in parallel or with a time lag.

From DE 10 2007 053 904 B3 is known an apparatus having the features of the preamble of claim 1. The apparatus described therein has a separating unit with two circular blades which are driven in the same direction, the direction of transport. This means that in direction during cutting or separation in the fish the circular blades nm in the direction of transport T, and in the process pull or accelerate the fish. The two circular blades mounted coaxially with each other and therefore running parallel to each other enter counter-supports for cutting or separating, due to the direction of rotation of the circular blades being the same as the direction of transport T, in order to guarantee a reliable separating cut. This results in a shearing action between the rotating circular blade and the fixed counter-support. This apparatus known from the state of the art has, however, the drawback that the fish can be pulled off the supporting body due to the direction of rotation of the circular blades running in the direction of transport T, which leads to incorrect cuts. Moreover there is an increased susceptibility to breakdown, as the fillets in certain circumstances are pulled between the circular blades. The parallel arrangement of the circular blades with each other further leads to the possibility of the backbone being wedged between the circular blades and then torn upwards uncontrolled. Furthermore, the hygiene requirements with the known arrangement of circular blade and counter-support can be met only with considerable effort, as cleaning the areas between circular blade and counter-support is laborious.

It is therefore the object of the invention to provide a simple and reliable apparatus which ensures improved and more reliable separation of the fillets from the skeleton. Furthermore it is the object to propose a corresponding method.

The object is achieved firstly by an apparatus having the features mentioned hereinbefore, by the fact that the two circular blades of the separating unit are driven in the same direction opposite the direction of transport T. Driving in the same direction opposite the direction of transport T describes the direction when the circular blades impinge on the fish. Due to the opposite direction, which is referred to the position or the moment in which the circular blades encounter the fish for cutting, the fish is pushed in the direction opposite the direction of transport T or decelerated, so that the fish remains in its stable position on the supporting body. Due to the design according to the invention, namely the direction of the circular blades opposite the direction of transport T, reliable cutting of the circular blades is achieved, which can be used at low cost in particular on existing apparatuses as well. Due to the reversal of the direction of rotation of the circular blades, the previous design of the counter-supports can be dispensed with, so that the apparatus according to the invention is easier to clean, compared with the known apparatuses.

A preferred embodiment of the invention is distinguished in that the two circular blades are arranged at an angle $\alpha$ to each other, such that the distance between the circular blades increases in the direction opposite the direction of transport T. With this design, a deflecting angle is produced between the circular blades or their cutting edges and the backbone or skeleton, so that the risk of the circular blades cutting into the backbone or skeleton and hence bone residues in the fillet is minimized.

An appropriate development of the invention is characterised in that the two circular blades are arranged at an angle $\beta$ to each other, such that the distance between the circular blades increases upwardly, starting from the plane of transport E. Due to the V-shaped position of the circular blades, between which the distance increases with an increase in the distance from the plane of transport E, a free space is created, which prevents wedging of the backbone or skeleton between the circular blades.

Advantageously, each circular blade is assigned a scraping element which abuts closely against the outside of the circular blades, wherein the scraping elements are arranged on the respective pivot lever. Due to the additional scraping elements which, in addition to a guiding function for the detached fillets laterally away from the circular blades, in particular also have a separating function for detaching regions which have not been separated by preceding tools, in particular the circular blades, the cutting quality is improved and the yield increased.

The object is secondly achieved by a method having the steps mentioned hereinbefore, by the fact that the circular blades rotate in the same direction opposite the direction of transport T during separation. The resulting advantages have already been described in conjunction with the apparatus, so that reference is made to the corresponding passages to avoid repetition.

Figure 2:
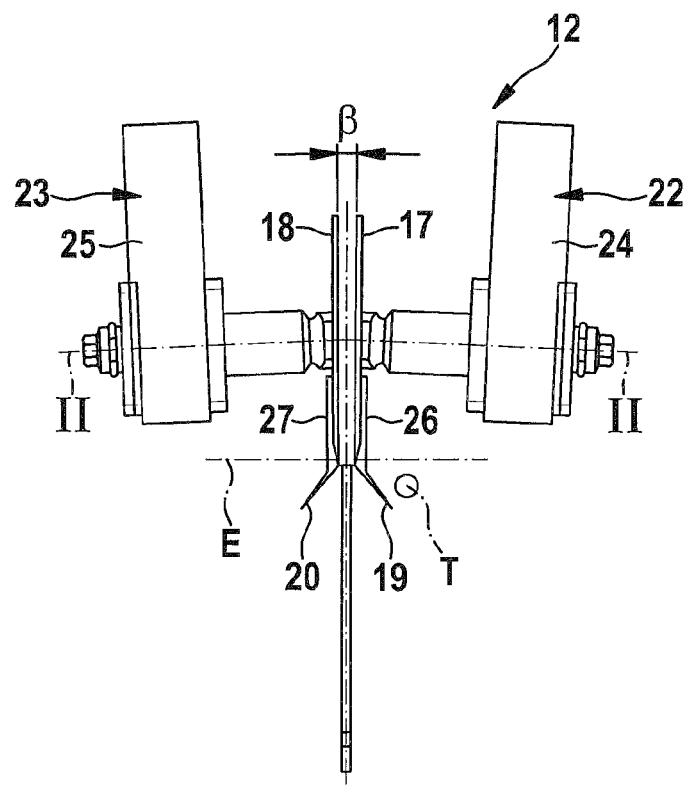
Figure 3:
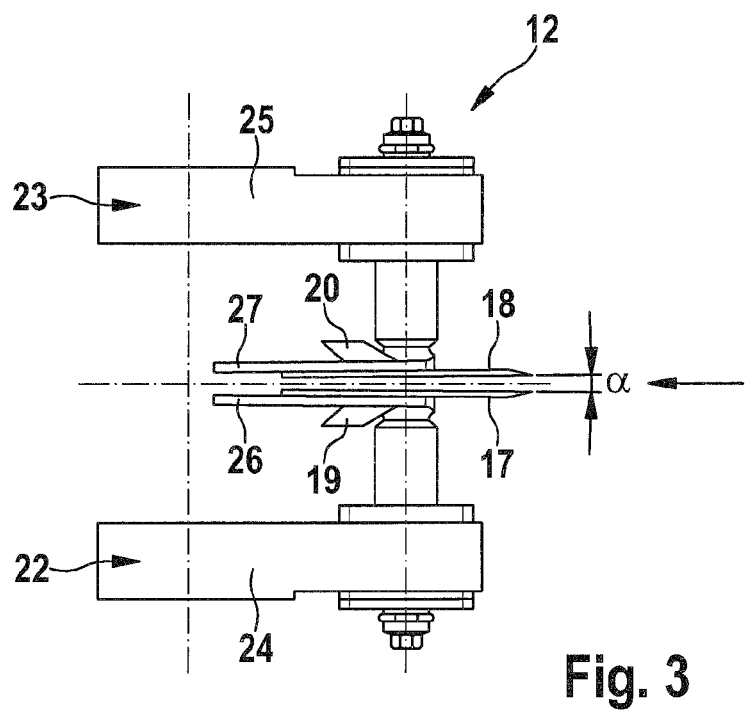
Figure 4:
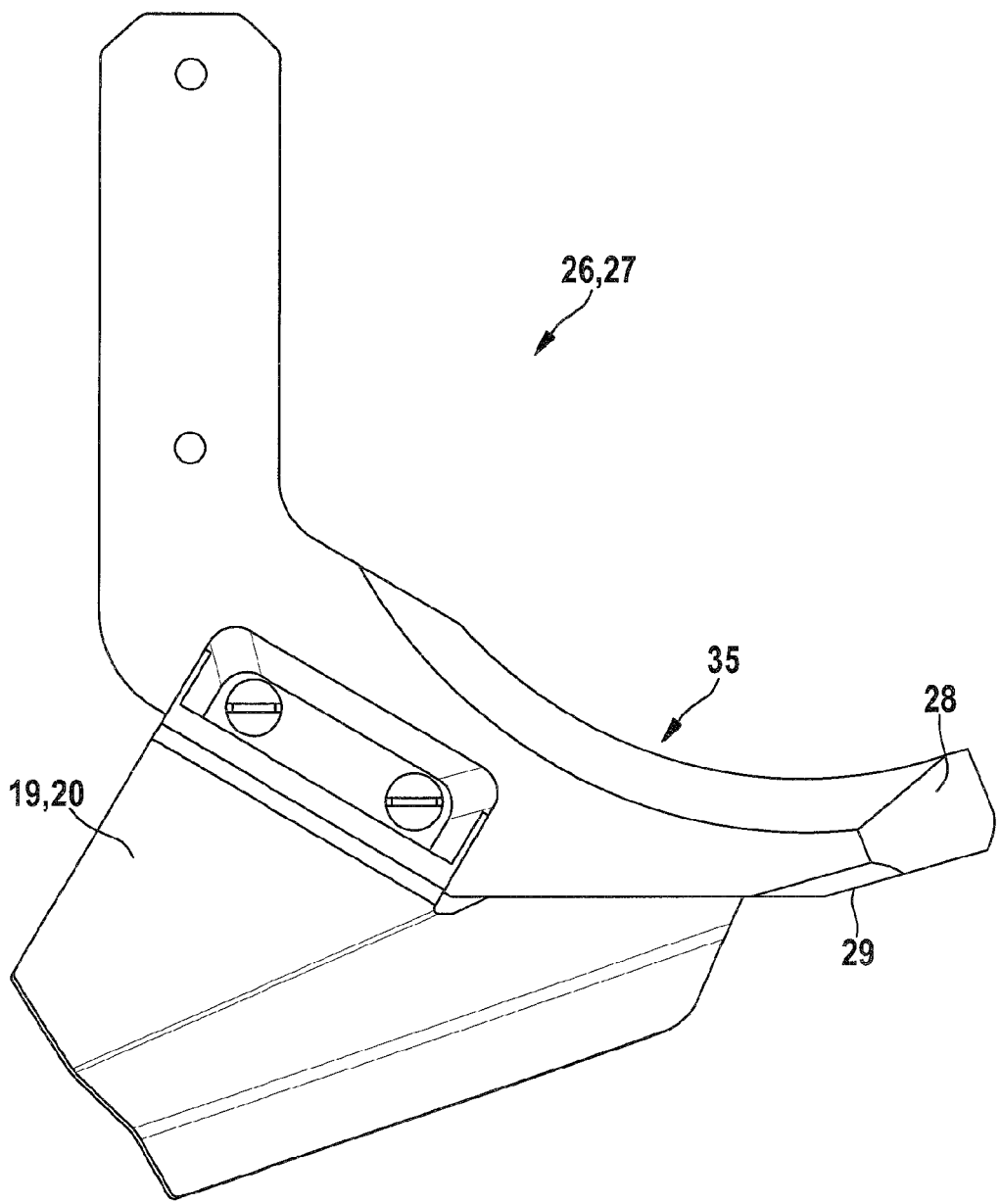

Further appropriate and/or advantageous features and developments of the invention are apparent from the subsidiary claims and the description. A particularly preferred embodiment of the invention as well as the principle of the method according to the invention are described in more detail with the aid of the attached drawings. The drawings show:

FIG. 1 a schematic side view of the apparatus according to the invention,

FIG. 2 a front view of the apparatus as in FIG. 1,

FIG. 3 a top view of the separating unit of the apparatus according to FIG. 1, and FIG. 4 a side view of the scraping elements assigned to each circular blade.

The apparatus shown in the drawings serves for completely separating the fillets which have already been partly detached by ventral cuts, dorsal cuts and other separating cuts, namely e.g. by scraping, raking, cutting or the like, from the skeleton of a fish, beginning with the root of the tail of a fish, up to the beginning of the ventral cavity.

The apparatus 10 for completely separating fillets from the skeleton of decapitated and gutted fish 11, cutting through a web left by ventral and dorsal blades (not shown) as well as possibly other separating tools round the backbone 15 of the fish 11, comprises a separating unit 12 as well as an endlessly rotating transport conveyor 13 having at least one supporting body 14. The fish 11 lies with its backbone 15 on a supporting edge 16 of the supporting body 14. The fish 11 is conveyed tail first through the apparatus 10 with its back at the top in the direction of transport T. Here, the fish 11 or its backbone 15 or, to be more precise, the supporting edge 16 of the supporting body 14 defines the plane of transport E. The endlessly rotating transport conveyor 13 preferably comprises several supporting bodies 14. These saddle-shaped supporting bodies 14, which are also referred to as transport saddles, are mounted stationarily but releasably on the transport conveyor 13 and rotate with the latter. The supporting bodies 14 are constructed and designed for receiving the fish 11. By means of the supporting body 14, the fish 11 lying on it can be conveyed tail first through the separating unit 12 in the direction of transport T.

The separating unit 12 has a pair of circular blades 17, 18 which are constructed and designed to separate the web located round the backbone 15 from the tail fin or the root of the tail to the beginning of the ventral cavity and left by the separating or cutting tools which are mounted upstream in the direction of transport T. The circular blades 17, 18 which form the pair of circular blades are mounted above the plane of transport E, that is, above the transport conveyor 13, for engagement in the fish 11, and rotated about an axis II. The circular blades 17, 18 are arranged on a carrier 21. By means of the carrier 21, the separating unit 12 is movable up and down transversely, that is, with at least one vertical component, to the plane of transport E. This capacity for movement can be used to equalise differences in height, but also to move the separating unit 12 out of a standby position into a working position and vice versa. The movement can be performed linearly, arcuately or otherwise in the usual manner. A pivot movement of the carrier 21 about an axis I is preferred. During the actual separating or detachment operation by the two circular blades 17, 18 of the separating unit 12, the two circular blades 17, 18 are driven in the same direction opposite the direction of transport T about the axis II. In other words, the direction of both circular blades 17, 18 is opposite the direction of transport T upon entry into the fish 11 or on the side of the circular blades 17, 18 close to the transport conveyor 13.

The two circular blades 17, 18 can be arranged parallel to and spaced apart from each other. The preferred arrangement of the circular blades 17, 18, however, is at an angle α to each other, such that the distance between the circular blades 17, 18 increases in the direction opposite the direction of transport T. In other words, the distance between the circular blades 17, 18 decreases in the direction of transport T, so that on the one hand it is made easier to pass the backbone 15 between the circular blades 17, 18 and on the other hand, as the path of transport progresses, the circular blades 17, 18 come closer to the backbone 15. Alternatively or in addition, the two circular blades 17, 18 can also be arranged at an angle β to each other such that the distance between the circular blades 17, 18 increases upwardly, starting from the plane of transport E, so that a V-shaped channel is formed, which on the one hand guides the backbone 15 and on the other hand prevents wedging of the backbone 15.

As can be seen in the drawings, it is preferred that the separating unit 12 comprises two partial units 22, 23. Each partial unit 22, 23 optionally also has, in addition to a circular blade 17 or 18, a blade cover 30 or 31, and comprises in each case a pivot lever 24, 25 on which are mounted the circular blades 17, 18 and the blade covers 30, 31. The pivot levers 24, 25 are rotatable or pivotable about the axis I. The two partial units 22, 23 can also be connected to each other to form a common, one-piece separating unit 12. The partial units 22, 23 or, to be more precise, the pivot levers 24, 25 are optionally also constructed and designed in a known manner to adjust and vary the gap or distance between the circular blades 17, 18. Preferably the two circular blades 17, 18 are driven at the same speed. However, there is also the possibility of varying the driving speeds of the two circular blades 17, 18, this being also differently to each other. Optionally, the partial units 22, 23 are also designed to be adjustable in height.

The blade covers 30, 31 are, like the circular blades 17, 18, movable about the axis II, and in fact pivotable independently of the rotation of the circular blades 17, 18. The blade covers 30, 31 are preferably operatively connected to upper bone guides 32, 33 in such a way that a yielding movement of the bone guides 32, 33 can be transmitted via a bolt 34 or the like to the blade covers 30, 31. In other words, the pivot movement of the blade covers 30, 31 is controlled by the upper bone guides 32, 33. In addition to the covering function of the blade covers 30, 31 and their function of guiding the tail fin between the circular blades 17, 18, the blade covers 30, 31 can also serve as a means of holding down the fish 11 to be processed. The fish 11 to be processed can, due to the direction of the circular blades 17, 18 which is opposite the direction of transport T, have a tendency to be pushed upwards away from the supporting body 14. The blade covers 30, 31 prevent the fish 11 from being lifted in a simple manner and without additional elements, preferably just by their own weight, and so stabilise the position of the fish 11 on the supporting body 14.

In a further optional embodiment, each circular blade 17, 18 can be assigned a scraping element 26, 27. The scraping elements 26, 27 preferably abut close against the outside of the circular blades 17, 18 or are a short distance from the outside or surface of the circular blades 17, 18. The scraping elements 26, 27 are preferably also mounted on the corresponding pivot levers 24, 25, preferably releasably, so that the relative position of the scraping elements 26, 27 to the circular blades 17, 18 does not change during a pivot movement of the pivot levers 24, 25 about the axis I. Naturally, however, the position of the scraping elements 26, 27 relative to the circular blades 17, 18 is adjustable. The scraping elements 26, 27 can each be assigned a deflector element 19, 20. The deflector elements 19, 20 protrude transversely to the direction of transport T beyond the circular blades 17, 18 and the scraping elements 26, 27. On the side facing towards the fish 11 to be processed, the scraping elements 26, 27 have a flattened or blunted tip 28 extending obliquely outwards in the direction of transport T, by means of which the tail section of the already detached fillets is guided sidewards away from the circular blade 17 or 18. The lower side 29 of the approximately crescent-shaped section 35 of the scraping elements 26, 27, of which the curvature approximately corresponds to the arcuate shape of the circular blades 17, 18, is constructed and designed to cut any regions not separated by the circular blades 17, 18. For this purpose, a separating edge is formed on the lower side 29.

Below, the principle of the method is described in more detail with the aid of the figures. The fish 11 which is located on the supporting body 14 and which has already been subjected to the ventral cuts and dorsal cuts or possibly other separating cuts, is transported in the direction of transport T tail first towards the apparatus 10 or separating unit 12. The fish 11 is passed between the blade covers 30, 31, guided by the lower bone guides (not shown) and the upper bone guides 32, 33. Due to the shape and/or layout of the blade covers 30, 31 relative to each other, the fish 11 is guided reliably between the circular blades 17, 18. Entry of the fish 11 between the circular blades 17, 18 can be further assisted or facilitated by the above-mentioned angular position of the circular blades 17, 18 and/or the pivoting of the partial units 22, 23 towards and away from each other. Entry of the fish 11 between the circular blades 17, 18 and/or its size can optionally be established by detection means, not shown. When the tail fin is located between the circular blades 17, 18, the circular blades 17, 18 are adjusted to the actual cutting distance. Before the fish 11 reaches the circular blades 17, 18, the latter are moved or pivoted into their working position. In the event that such detection means are not provided, the circular blades 17, 18 are preset before entry of the fish 11 to be processed and moved into their working or cutting position.

During continuous transport of the fish 11 through the separating unit 12, the webs left by the ventral blades and dorsal blades or other tools round the backbone 15 or vertebral column, from the tail fin to the beginning of the ventral cavity, are completely separated by the circular blades 17, 18, by rotating the two circular blades 17, 18 in the same direction opposite the direction of transport T during separation. On cutting into the fish 11 the circular blades 17, 18 act with a decelerating effect on the fish 11 due to the chosen direction, or cause it to make an upward movement which is prevented by the blade covers 30, 31 as a hold-down device. If the fillets are not completely detached from the skeleton by the circular blades 17, 18, the scraping elements 26, 27 can completely separate the regions in the fillet flesh which have not been cut free by the preceding tools. The fillets completely detached from the skeleton are then laterally deflected from the circular blades 17, 18 by the scraping elements 26, 27 and/or the guide elements 19, 20 mounted thereon. Depending on the size of the fish 11 to be processed, the circular blades 17, 18 or the partial units 22, 23 in their entirety are adjusted in width to vary the distance between the circular blades 17, 18 and/or in height.

The invention claimed is:

1. Apparatus for completely separating fillets from the skeleton of decapitated and gutted fish, cutting through a web left by separating tools mounted in front of the apparatus in the direction of transport T, comprising a separating unit with a pair of circular blades for separating the web, and an endlessly rotating transport conveyor with at least one saddle-shaped supporting body for receiving the fish and conveying them in the direction of transport T through the separating unit tail first, wherein the circular blades are mounted on a carrier which is movable up and down transversely to the plane of transport E, characterised in that the two circular blades of the separating unit are driven in the same direction opposite the direction of transport T.

2. Apparatus according to claim 1, characterised in that the two circular blades are arranged at an angle $\alpha$ to each other, such that the distance between the circular blades increases in the direction opposite the direction of transport T.

3. Apparatus according to claim 1, characterised in that the two circular blades are arranged at an angle $\beta$ to each other, such that the distance between the circular blades increases upwardly, starting from the plane of transport E.

4. Apparatus according to claim 1, characterised in that the separating unit comprises two partial units, wherein each partial unit has a circular blade and a blade cover, and the circular blade and the blade cover are mounted on a pivot lever for pivoting about an axis I.

5. Apparatus according to claim 4, characterised in that the circular blades and the blade covers are rotatable or pivotable about an axis II, wherein the circular blades are constructed and arranged to be movable independently of the blade covers.

6. Apparatus according to claim 4, characterised in that the partial units are constructed and designed to vary the distances between the circular blades.

7. Apparatus according to claim 4, characterised in that each circular blade is assigned a scraping element which abuts closely against the outside of the circular blades, wherein the scraping elements are arranged on the respective pivot lever.

8. Apparatus according to claim 7, characterised in that the scraping elements are each assigned a deflector element.

9. Method for completely separating fillets from the skeleton of decapitated and gutted fish, cutting through a web left during previous separating cuts, in particular ventral cuts and dorsal cuts, comprising the steps of:
    transporting a fish resting with its backbone on a supporting body with its back at the top, tail first through an apparatus for separating the fillets from the skeleton, wherein
    the fillets are separated from the skeleton during transport by means of rotating circular blades,
characterised in that the circular blades rotate in the same direction opposite the direction of transport T during separation.

10. Method according to claim 9, characterised in that the fillets are guided laterally away from tilted circular blades by the latter.

11. Method according to claim 9, characterised in that scraping elements abutting closely against the circular blades from the outside actively assist separation of the fillets and at the same time deflect the fully detached fillets laterally from the circular blades.

* * * * *